United States Patent [19]

Sylvest

[11] 4,004,876
[45] Jan. 25, 1977

[54] METHOD OF BURNING PULVEROUS RAW MATERIAL AND ROTARY KILN PLANT THEREFOR

[75] Inventor: Karl Jens Sylvest, Copenhagen Valby, Denmark

[73] Assignee: F. L. Smidth & Co., Cresskill, N.J.

[22] Filed: Mar. 19, 1975

[21] Appl. No.: 559,705

[30] Foreign Application Priority Data

Mar. 22, 1974 United Kingdom ............. 12858/74

[52] U.S. Cl. .................................. 432/14; 432/58; 432/105; 432/106
[51] Int. Cl.² ...................... F27B 15/00; F27B 7/02
[58] Field of Search ........... 432/5, 14, 15, 58, 105, 432/106

[56] References Cited

UNITED STATES PATENTS

| 1,558,965 | 10/1925 | Clevenger | 432/106 |
| 2,063,233 | 12/1936 | Debuch | 432/105 X |
| 2,694,565 | 11/1954 | Sainderichin | 432/106 |
| 3,758,266 | 9/1973 | Retali et al. | 432/14 |
| 3,770,369 | 11/1973 | Mikami et al. | 432/15 |
| 3,881,862 | 5/1975 | Nishida et al. | 432/14 |
| 3,904,353 | 9/1975 | Bosshard et al. | 432/14 |

Primary Examiner—John J. Camby
Attorney, Agent, or Firm—Pennie & Edmonds

[57] ABSTRACT

A method of burning pulverous raw materials in a rotary kiln is disclosed wherein the material is preheated and at least partially calcined prior to subjecting it to a finishing heat treatment such as sintering. The calcination of the raw material is accomplished prior to the final burning by feeding preheated at least partially calcined raw material to the upper inlet end portion of an inclined rotary kiln and mixing it intimately with a fuel capable of producing a combustible gas. The combustible gas thus produced is passed to a calcination chamber communicating with the upper end of the rotary kiln. Substantially uncalcined raw material is suspended in the gas mix while an oxygen-containing gas capable of supporting combustion in the calcination chamber is provided causing the oxygen-containing gas to be ignited and calcined substantially isothermally. A rotary kiln plant for practicing the method is also disclosed in which the raw material is at least partially calcined in a calcination chamber communicating with the rotary kiln.

28 Claims, 4 Drawing Figures

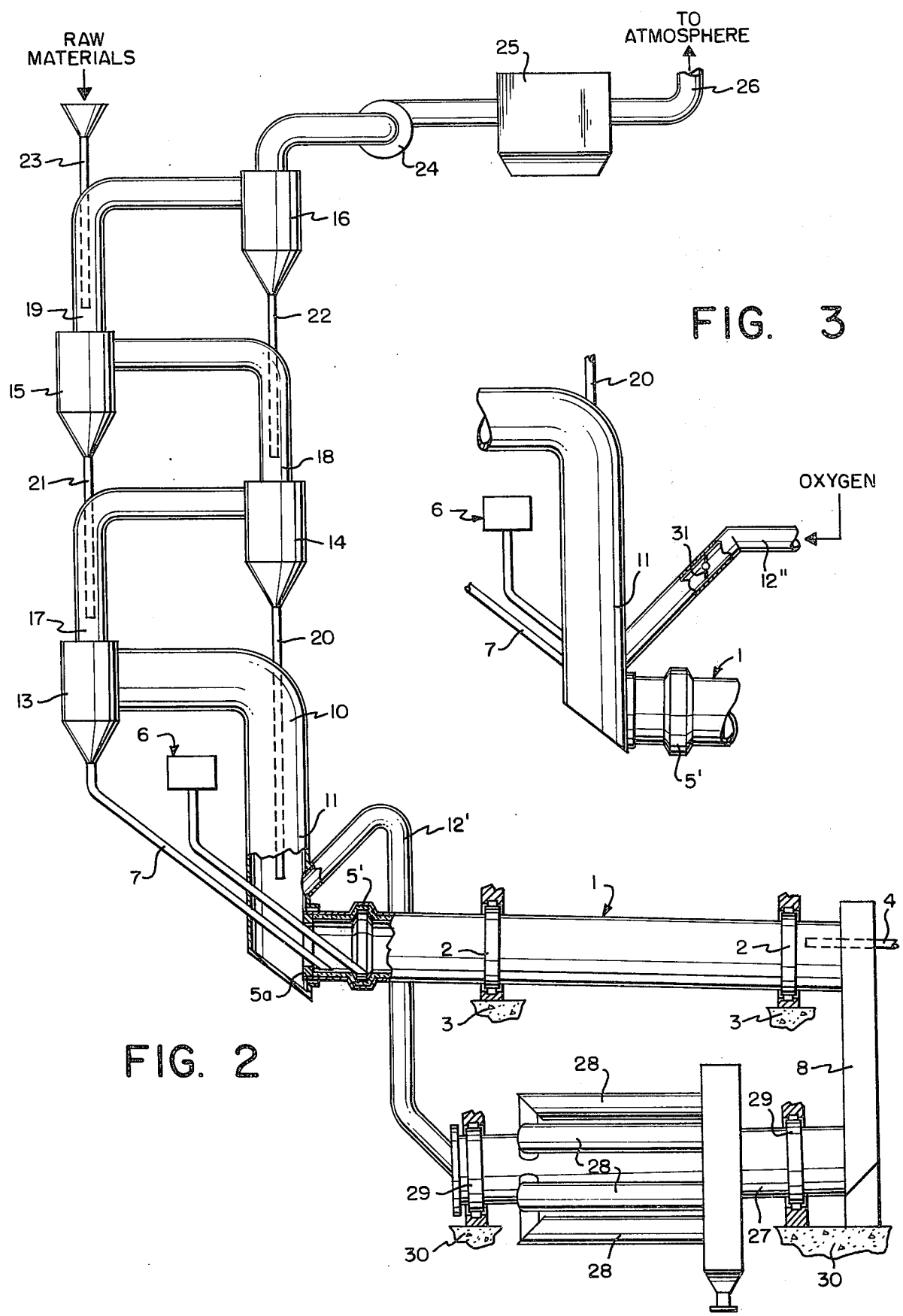

METHOD OF BURNING PULVEROUS RAW MATERIAL AND ROTARY KILN PLANT THEREFOR

BACKGROUND OF THE INVENTION

1. Field of the Invention

This invention relates to a method of burning pulverous raw material containing lime, such as cement raw meal. The invention also relates to a rotary kiln plant for burning such materials.

2. Description of the Prior Art

Calcination of pulverous raw materials such as cement raw meal is to be understood as an expulsion of carbon dioxide ($CO_2$) from calcium carbonate by an endothermic process (i.e. a process in which heat is absorbed) according to the equation:

$$CaCO_3 \rightarrow CaO + CO_2$$

When the raw material is cement raw meal, the aforesaid finishing heat treatment following the calcination is a sintering by which cement clinker is produced. Sintering is an exothermic process characterized by, or formed with, evolution of heat. The sintering therefore only requires a modest supply of heat in order to raise the temperature of the raw material to the sintering temperature and to compensate for losses.

The heat necessary for carrying through the conversion of cement raw meal to cement clinker is usually obtained by burning fuel which together with combustion air, is introduced into a combustion chamber in which the fuel burns successively with the combustion air and forms smoke gas. As a result, the energy contained in the fuel is released for heating the smoke gas to a high temperature. The hot smoke gas is then brought into contact with the raw meal to be heat treated, i.e. preheated, calcined and burned. The heat treatment usually takes place as a continuous process in a rotary kiln with slightly inclining axis. Thus, the lower lying end of the rotary kiln is - as is usual for rotary kilns - designed as a combustion chamber.

However, in the manufacture of cement the trend is to carry through preheating and calcination of the raw meal separately by means of hot gas from one source of heat and sintering of the raw meal in a rotary kiln by means of hot gas from another source of heat, that is the flame of the rotary kiln. This is particularly due to the presence of alkalies in the raw meal.

As far as the calcination of cement raw meal is concerned, relatively large quantities of materials must be subjected to a relatively low heating. That is, the process takes place at a rather low temperature which is often inconsistent with the use of smoke gases of a high temperature for carrying through the calcination. There is a great risk of excessively heating the raw meal locally and temporarily. Even a brief period of excessively heating a part of the raw meal may cause expulsion of alkali vapors or produce melts which may involve caking problems. Furthermore, excessive heating of the raw meal at the calcination stage may prevent chemical reactions intended for a later stage of the whole process of manufacturing cement clinker. For example, the formation of clinker minerals at such stage of the whole heat treatment process at which calcination is to take place involves an unfavorable and disadvantageous development of the whole process.

U.S. Pat. No. 3,203,681 to Rosa et al. relates to a process wherein heat for carrying through the calcination of preheated cement raw meal derives from hot gases having a temperature higher than the calcination temperature. The gases are produced in a separate chamber and are passed upwardly in a riser column in which the raw material is suspended and entrained by the gases thus produced.

In a related development, commonly assigned U.S. patent application Ser. No. 423,436, filed December 10, 1973, now U.S. Pat. No. 3,955,995 is directed to calcination of pulverous material by mixing preheated raw material intimately with a fuel, capable of producing a combustible gas upon contacting the raw material, providing a gas capable of supporting combustion of the combustible gas thus produced to at least partially calcine the raw material, and separating the treated raw material from the stream of gases. U.S. patent application Ser. No. 450,291, filed Mar. 12, 1974 relates to a method of heat treating a preheated pulverous raw material wherein the material is accumulated in a lower portion of a calcination chamber and an oxygen-containing gas is introduced into a flame overlying the accumulation. I have invented a method of burning pulverous raw materials and a rotary kiln plant therefor wherein the raw material is at least partially calcined in an efficient manner prior to burning it in a rotary kiln by utilizing a portion of the rotary kiln and the tumbling action provided thereby for mixing preheated raw material with a fuel capable of producing a combustible gas upon contacting the raw material.

SUMMMARY OF THE INVENTION

A method of heat treating a preheated, pulverous raw material consisting entirely of, or at least containing a portion of, lime to produce at least a partial calcination thereof prior to passing the raw material down through an inclined rotary kiln for the further heat treatment, comprising feeding a preheated, at least partially calcined raw material to the upper end portion of the inclined rotary kiln and introducing into the upper end portion of the kiln a fuel capable of producing a combustible gas upon contacting the hot raw material. The method further comprises mixing the preheated raw material intimately with the fuel introduced into the upper end portion of the kiln and passing the combustible gas together with the kiln exit gas to a calcination chamber communicating with the upper end portion of the kiln. The method further comprises suspending substantially uncalcined raw material in the calcination chamber in said gas mix and providing a flow of oxygen-containing gas to said calcination chamber in a manner to contact the suspension of gas and raw material to cause the oxygen-containing gas to be ignited thereby at least partially calcining the individual particles of raw material substantially isothermally. The method further comprises separating the treated raw material from the combined stream of exit gases from the calcination chamber and feeding the treated raw material to the upper end of the kiln for further heat treatment in the kiln and for further mixing with fuel therein to continuously produce combustible gases.

It will be seen that whereas previous practice was to produce a flow of hot smoke gas by burning fuel and passing the hot gas through the raw material to be calcined, the heat is, according to the present method, generated at the place of consumption, that is, at the location where the raw material particles are suspended in the burning combustible gas. As a result the particles of preheated raw material, the oxygen, and the combustible gas are mixed very intimately, so that the calcination to the desired extent takes place approximately isothermally and at a relatively low temperature.

As mentioned, the fuel which, according to the invention, is fed to the upper end of the kiln, may either be a solid or a liquid fuel. In the former case a solid finely divided fuel, such as coal meal, may be used, but, alternatively, coarsely ground or pelletised fuel may be used. Both forms of solid fuel behave identically when meeting the hot calcined raw material in that they give off combustible gas similarly to evaporated fuel oils.

The oxygen-containing gas may consist of or contain atmospheric air or, more specifically, may consist of or contain atmospheric air which has been preheated by having been used for cooling the final rotary kiln product, i.e. waste cooling air. In this way the heat economy of the process is improved. The oxygen-containing gas may also be a mixture of atmospheric air and waste cooling air.

The oxygen-containing gas may be supplied to the calcination chamber through the kiln. Thus more secondary combustion air may be introduced into the lower end of the inclined rotary kiln than is required for nourishing with oxygen a flame which burns in the kiln for carrying out the heat treatment in the kiln. The surplus of oxygen-containing gas thus passes out of the upper end of the kiln as part of the kiln exit gas so as to constitute wholly or partly the supply of oxygen-containing gas to the calcination chamber.

It will be seen that whereas according to present day methods mixing of the heated raw meal and fuel takes place prior to any calcination, according to the present invention the raw material is mixed intimately with fuel not only in a preheated condition, but in an at least partially calcined condition. Moreover the fact that the tumbling action facilitated by the mixing section of the rotary kiln, combined with the fact that hot raw meal is being mixed in an at least partially calcined condition, is significant in that it avoids the necessity of providing additional space equipped with separate means for mixing the fuel and the raw meal.

In addition, it will be seen that whereas according to present day techniques, mixing takes place in relatively narrow pipes which tend to be choked by incrustations consisting of raw meal and fuel, the present invention does not suffer from such drawbacks, particularly since it utilizes the tumbling action of the rotary kiln and at least partially calcined raw meal for converting either solid or fluid fuel into a combustible gas.

The invention also relates to a plant for heat treating substantially uncalcined preheated pulverous raw material consisting entirely of, or at least containing a portion of, lime comprising an inclined rotary kiln for sintering the raw material, the kiln having an upper material inlet portion and a lower material outlet portion with means being provided for preheating raw material connected to the upper inlet end portion and communicating with the raw material preheating means. The plant further comprises means for accumulating a supply of preheated raw material in the inlet end portion of the rotary kiln and means for feeding a fuel into the inlet end portion of the rotary kiln, the fuel being capable of producing combustible gas upon contacting the hot raw material. The fuel is introduced into the kiln and tumbled to cause the fuel and accumulating raw material to become intimately mixed therein so as to produce a combustible gas. The invention further comprises means for introducing an oxygen-containing gas to said calcination chamber such that upon passing the combustible gas thereby produced to the calcination chamber, combustion of the oxygen-containing gas results in at least a partial substantially isothermal calcination of the preheated raw material.

In its preferred form, the raw material preheater is a cyclone suspension preheater. With such an arrangement, the riser pipe for the lowermost cyclone of the raw material preheater may advantageously constitute the calcinator.

The upper end of the inclined rotary kiln may be provided with means for forming in the kiln inlet an accumulation of the at least partly calcined raw material where the feeding means for the fuel opens into the kiln. The accumulation forming means serves to bring about an accumulation of the material which causes an effective mixing of the fuel and the hot calcined raw material and hence an effective expulsion of gaseous fuel.

In one embodiment the means for forming in the kiln inlet an accumulation of the material may consist of a ring projecting from the kiln lining and restricting the kiln diameter downstream where the feeding means for the fuel opens into the kiln. In another embodiment the means may consist of an outward bulge provided in the kiln wall at the location where the feeding means for the fuel opens into the kiln.

BRIEF DESCRIPTION OF THE DRAWINGS

Preferred embodiments of the invention are described hereinbelow with reference to the drawings wherein:

FIG. 2 is a diagrammatic representation of a modified plant in which the dam ring in the upper end of the kiln is replaced by a bulge;

FIG. 3 is a modified detail of the plant according to FIG. 2 indicating means for feeding oxygen-containing gas to the calcinator from another source than the clinker cooler.

DETAILED DESCRIPTION OF THE PREFERRED EMBODIMENTS

Figure 1:
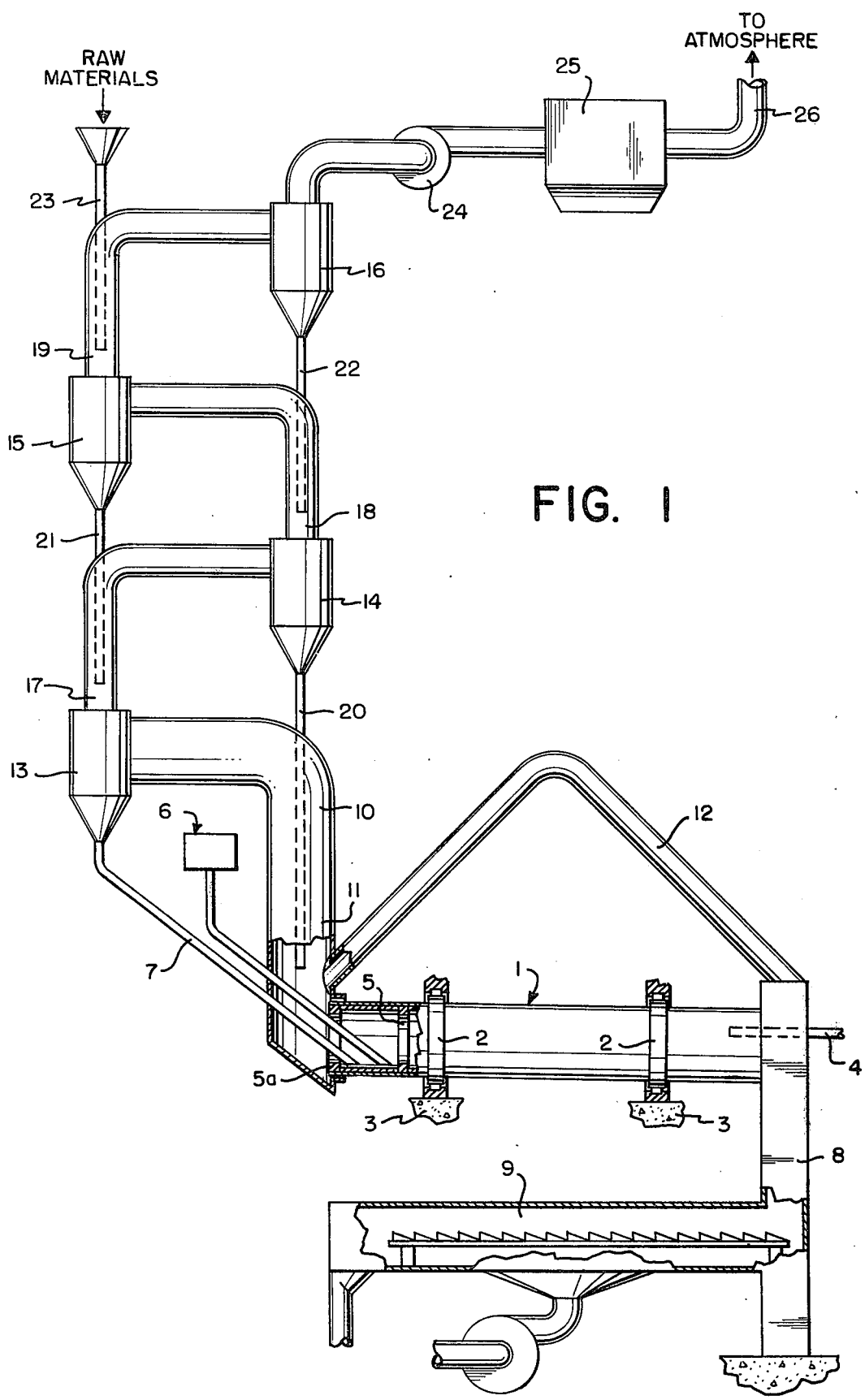
FIG. 1 is a diagrammatic representation of a complete plant for burning cement.

FIG. 1 shows a rotary kiln 1 with live rings 2 supported by rollers, as shown, resting rotatably on foundations 3. The rotary kiln is further provided with a burner pipe 4, a dam ring 5, another ring 5a serving to prevent back-spill of calcined raw meal, feeding means 6 for fuel and a pipe 7 for supplying calcined raw meal.

The rotary kiln 1 is at its lower end connected to a shaft-formed clinker chute 8 through which the clinker passes to an underlying grate clinker cooler 9 of conventional type. The chute 8 also serves to carry cooling air away from the clinker cooler 9 in counter-current to the stream of falling clinker and into the kiln so as to serve as secondary combustion air in the kiln.

The inclined rotary kiln 1 is at its upper end connected to a riser pipe 10, the lower end of which at the same time is constructed so as to constitute a shaft-formed calcinator 11, equipped with a pipe 12 for supplying oxygen-containing gas in the form of waste cooling air from the clinker cooler 9 via the chute 8. The combined riser pipe 10 and calcinator 11 open upwardly into a separating cyclone 13 which constitutes part of a raw meal preheater of the cyclone type with a total of four cyclones 13, 14, 15 and 16, with appertaining riser pipes 10, 17, 18 and 19, and raw meal feed pipes 7, 20, 21, 22 and 23, of which the last-mentioned one serves to feed raw meal to the preheater. Gas is drawn through the entire plant by means of an exhaust fan 24, connected at its pressure side to a dust precipitator 25, and further to a chimney of which only the lowermost part 26 is indicated.

FIG. 2 shows the same type of plant as that described with reference to FIG. 1. However, the kiln 1 is provided with a bulge 5' instead of the dam ring 5 for damming up the material in the kiln. The pipe 12' is, contrary to the pipe 12 according to FIG. 1, connected to the opposite end of the clinker cooler. Further, the cement clinker cooler is an underlying rotating type with a central drum 27, equipped with planetarily arranged cooler tubes 28 and encircled by live rings 29 supported by rollers, as shown, resting rotatable on foundations 30.

FIG. 3 shows a modified detail of the plant according to FIG. 2. The shaft-formed calcinator 11 is provided with a pipe 12" for the supply of oxygen-containing gas from a source other than the clinker cooler. This pipe has a damper 31 for regulating the amount of gas supplied which is preferably a preheated gas mixture. This gas mixture may be fresh atmospheric air or a mixture of oxygen-containing gas from various sources.

During operation of the plant according to FIG. 1, fuel is supplied by the feeding means 6 to the accumulation of hot calcined raw meal between the back-spill preventing ring 5a and the dam ring 5. Owing to the heat contained in the accumulation, the fuel evaporates (or gives off gas), and this vapor or gas is entrained by the hot kiln exit gas and passed into the calcinator 11 without being ignited, since according to the preferred embodiment the exit gas from the kiln contains no oxygen. In the calcinator 11, the hot gases are mixed with raw meal which has followed the path characterized by the reference numerals 23, 19, 16, 22, 18, 15, 21, 17, 14, 20, gradually rising in temperature. Only when the said gas mixture meets the oxygen-containing gas introduced through the pipe 12 will the combustible gases ignite, and the calcination takes place, after which the calcined raw meal will be separated from a gas glow in the cyclone 13 to be finally introduced into the kiln 1 through the pipe 7.

In the kiln 1, such material particles as may not already be completely calcined are subjected to a finishing calcination, and in any case completely calcined material is subsequently sintered in the kiln to form the final clinker product. The clinker is passed to the clinker cooler 9 via the shaft-formed clinker chute 8. By way of example, clinker cooler 9 is shown as a grate cooler, but might be of another type. Thus, in FIG. 2, a rotating cooler type is shown equipped with planetarily arranged cooler tubes.

The oxygen-containing gas may, as illustrated in FIG. 1, originate from the cooler 9, and be extracted from the chute 8 and passed to the calcinator 11 via the pipe 12. Since the calcination of the raw meal requires approximately double the amount of combustion air required for the subsequent sintering of the calcined raw material, care is taken by proper dimensioning of the gas paths to make sure that of the gas flow passing up through the chute 8, about one third passes into the kiln 1, whereas about two thirds pass through the pipe 12 into the calcinator 11.

Since one disadvantage of the plant according to FIG. 1 is the necessity of providing the wide and long pipe 12 which serves to convey waste cooling air a distance exceeding the length of the kiln 1, an alternate embodiment is shown in FIG. 2 in which pipe 12 is shortened considerably. The oxygen-containing gas comprising about two thirds of the waste cooling air is here taken from the end of the rotating type clinker cooler as shown, at a location remote from the connection with the kiln. This air is then passed to the calcinator 11 via the relatively short pipe 12'. The remaining one third of the waste cooling air is via the chute 8 passed into the rotary kiln 1. The plant according to FIG. 2 is an improvement in this respect since the length of the pipe referred to (marked 12' in FIG. 2) is shortened by a length corresponding substantially to the horizontal length of the clinker cooler.

As indicated in FIG. 3, the damper 31 provided in the pipe 12" may be used for regulating the amount of oxygen-containing gas passed to the calcinator 11. The gas in this case is assumed to be fresh atmospheric air, but might be a mixture of gas from various available sources, preferably in a preheated state, so as to increase the heat economy of the process.

Figure 4:
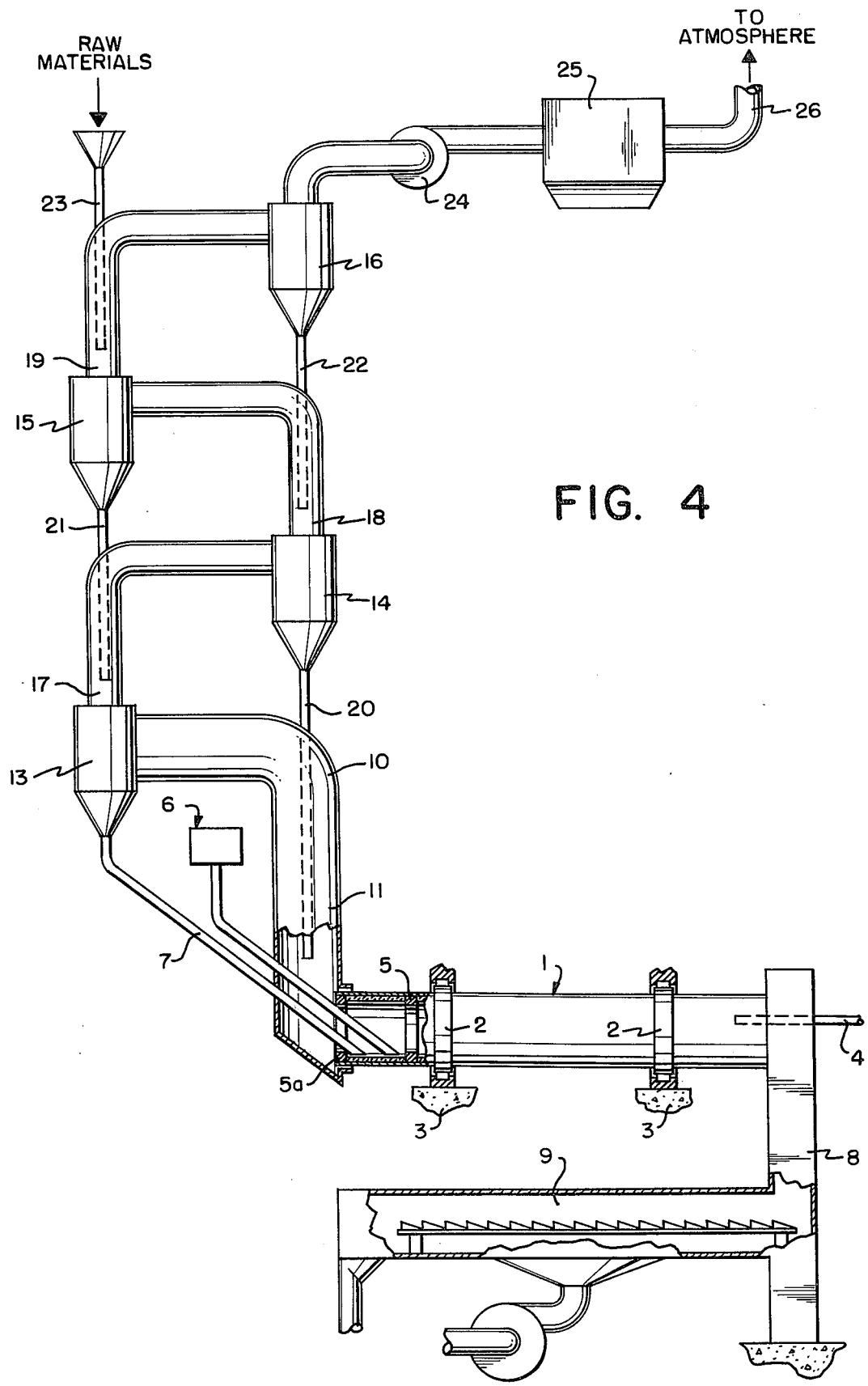
FIG. 4 is a diagrammatic representation of another modification of a plant in which the rotary kiln in addition to its other functions serves as source for oxygen-containing gas for the calcinator.

In the plant according to FIG. 4, the pipe 12 (or 12') is left out altogether. However, other measures have been taken to ensure that oxygen-containing gas is carried to the calcinator. In the plant shown in FIG. 4, care is taken that more secondary combustion air is introduced from the clinker cooler 9 via the chute 8 into the lower end of the inclined rotary kiln 1 than is required for the sintering to cement clinker of the calcined raw meal to be carried out in the kiln 1. When the rotary kiln 1 is operated as described, the gases passing out of the dam ring 5 will, contrary to ordinary rotary kiln operation practice, contain sufficient oxygen to nourish the combustion in the calcinator 11 of the fuel added to the inlet end of the kiln 1 through the feeding device 6.

While the plant of FIG. 4 is advantageous in certain respects - particularly in that the extra piping is avoided - it does involve a degree of risk that due to the presence of oxygen at the locality where the combustible gas is generated (in the accumulation of calcined raw meal in the rotary kiln 1 between the rings 5 and 5a) a part of the gas may be ignited before reaching the calcinator 11 to meet the preheated raw meal discharged from the mouth of the pipe 20. Such early ignition of the gases is undesirable because it may cause the kiln mouth structure to attain a temperature too high for the material of which this structure and its surroundings are normally manufactured. For this reason, notwithstanding the advantages of the plant of FIG. 4, the plants of FIG. 1 and FIG. 2 are nevertheless preferred.

Thus in the various embodiments described, the oxygen-containing gas is supplied by various means. Thus it may be supplied as in the plant illustrated in FIG. 2, by a pipe 12' connected to the end of the planetary cooler opposite the clinker chute 8. The oxygen containing gas is thus taken from the end of the clinker cooler remote from the connection with the kiln. In FIG. 3, pipe means 12' is designed to supply oxygen-containing gas to the calcinator from various sources other than the clinker cooler. In FIG. 4, the oxygen is supplied by introducing more secondary combustion air from the clinker cooler 9 via the chute 8 into the lower end of kiln 1 than is required for sintering the calcined raw meal to cement clinker. When the rotary kiln 1 is operated the kiln exit gas which contains enough oxygen to nourish combustion in the calcinator 11 passes to the calcinator where calcination of the raw material takes place.

I claim:

1. A method of heat treating pulverous raw material consisting entirely of, or at least containing a substantial portion of, lime to produce at least a partial calcination thereof prior to passing the material down through an inclined rotary kiln for further heat treatment, the kiln having hot gases generated therein and communicating at its material inlet end portion with a multistage raw material preheating means and a calcination chamber through which the hot kiln gases are directed for at least partially calcining the preheated material, and at the material outlet end portion with means for cooling the kiln product comprising:
   a. feeding pulverous raw material to said preheating means for preheating with the hot kiln exit gases passing from the upper end of the kiln to said preheating means prior to feeding the material to the material inlet end portion of the kiln;
   b. introducing into the upper material inlet end portion of the rotary kiln proper, a fuel capable of producing a combustible gas upon contacting the hot material;
   c. causing the fuel to mix intimately with the preheated material in the upper material inlet end portion within the kiln proper so as to produce a combustible gas;
   d. causing the combustible gas to be directed with the kiln exit gases from the upper inlet end portion of the kiln proper to the calcination chamber communicating therewith;
   e. suspending substantially uncalcined raw material in the calcination chamber in said gas mix;
   f. directing into the calcination chamber a sufficient amount of preheated oxygen-containing gas from the cooling means so as to contact the suspension of gas and raw material in the chamber and causing the oxygen-containing gas to be ignited and to thereby preheat and at least partially calcine substantially isothermally, the raw material suspended in the combined gases in the calcination chamber;
   g. directing the combined stream of hot gases and preheated, at least partially calcined material into the last stage of the preheating means;
   h. separating the treated material from the combined stream of exit gases from the calcination chamber; and
   i. feeding the treated material to the upper material inlet end portion of the kiln for further heat treatment in the kiln and for mixing with fuel therein to continuously produce combustible gas with said fuel.

2. The method according to claim 1 further comprising providing a flow of oxygen-containing gas containing at least a portion of atmospheric air to said calcining chamber.

3. The method according to claim 1 further comprising:
   a. directing cooling air over the material after heat treatment in the kiln thereby cooling said material; and
   b. taking at least a portion of the heated cooling air and providing it with said oxygen-containing gas to said calcination chamber.

4. The method according to claim 2 further comprising:
   a. directing cooling air over the material after heat treatment in the kiln thereby cooling said material; and
   b. taking at least a portion of the heated cooling air and providing it with said oxygen-containing gas to said calcination chamber.

5. The method according to claim 1 further comprising:
   a. introducing into the lower end of the inclined rotary kiln, secondary combustion air in an amount greater than is required for nourishing with oxygen a flame burning in the kiln carrying out the heat treatment in the kiln; and
   b. directing the surplus of oxygen containing gas passing out the upper end of the kiln as part of the kiln exit gas in a manner at least partially supplying said oxygen-containing gas to said calcination chamber.

6. The method according to claim 2 further comprising:
   a. introducing into the lower end of the inclined rotary kiln, secondary combustion air in an amount greater than is required for nourishing with oxygen a flame burning in the kiln carrying out the heat treatment in the kiln; and
   b. directing the surplus of oxygen containing gas passing out of the upper end of the kiln as part of the kiln exit gas in a manner at least partially supplying said oxygen-containing gas to said calcination chamber.

7. The method according to claim 3 further comprising:
   a. introducing into the lower end of the inclined rotary kiln, secondary combustion air in an amount greater than is required for nourishing with oxygen a flame burning in the kiln carrying out the heat treatment in the kiln; and
   b. directing the surplus of oxygen-containing gas passing out of the upper end of the kiln as part of the kiln exit gas in a manner at least partially supplying said oxygen-containing gas to said calcination chamber.

8. The method according to claim 1 further comprising feeding preheated raw material in the form of cement raw meal.

9. The method according to claim 8 further comprising introducing a fuel in a solid state to said upper material inlet end portion of the kiln.

10. The method according to claim 8 further comprising introducing a fuel in a liquid state to said upper material inlet end portion of the kiln.

11. The method according to claim 2 further comprising feeding preheated raw material in the form of cement raw meal.

12. The method according to claim 3 further comprising feeding preheated raw material in the form of cement raw meal.

13. The method according to claim 5 further comprising feeding preheated raw material in the form of cement raw meal.

14. A method of preheating and at least partially calcining pulverous raw material preferably in the form of cement raw meal prior to passing the material down through an inclined rotary kiln for sintering to form a final product such as cement clinker, the kiln having hot gases generated therein and communicating at its upper material inlet end portion with a calcination chamber through which the hot kiln gases may be directed for at least partially calcining the preheated material, and a multistage cyclone suspension preheater for preheating the raw material, and at the material outlet end portion with means for cooling the kiln product comprising:

a. directing the material to said preheater for preheating and at least partially calcining with the hot kiln exit gases passing from the material inlet end portion of the kiln prior to passing the material down through the kiln;
   b. maintaining a draft of hot kiln exit gases to pass out of the material inlet end portion of the kiln through the calcination chamber;
   c. introducing into the interior of the material inlet end portion of the rotary kiln proper, a fuel capable of producing a combustible gas upon contacting hot material therein;
   d. causing the preheated material to become intimately mixed with the fuel within the upper end portion of the kiln proper by the tumbling action of the rotary kiln so as to produce a combustible gas;
   e. passing said combustible gas together with the kiln exit gases to the calcination chamber communicating with the upper inlet end portion of the kiln;
   f. suspending substantially uncalcined preheated material from the penultimate cyclone stage of the preheater into the calcination chamber in said gas mix from said rotary kiln;
   g. providing a flow of preheated oxygen-containing gas such as preheated cooling air to said calcination chamber in sufficient quantities so as to contact the suspension of gas and raw material in the calcination chamber thereby causing the oxygen-containing gas to be ignited so as to preheat and at least partially calcine substantially isothermally the material suspended in the combined gases in the calcination chamber;
   h. directing the combined stream of hot gases and preheated, at least partially calcined material from the calcination chamber to the last preheater cyclone stage;
   i. continuously separating in said last cyclone preheater stage, the heat treated material from the combined stream of exit gases from the calcination chamber to produce a continuous supply of preheated, at least partially calcined cement material; and
   j. directing a continuous flow of said separated material from said last preheater cyclone stage to the upper material inlet end portion of the kiln proper for sintering thereof.

15. A plant for heat treating pulverous raw material consisting entirely of, or at least containing a portion of, lime which comprises an inclined rotary kiln for sintering the material, said kiln having an upper material inlet end portion and a lower material outlet end portion, a calcination chamber communicating with the upper material inlet end portion of the rotary kiln, raw material preheating means communicating with the calcination chamber and the upper material inlet end portion of the rotary kiln for preheating the material prior to feeding it to the material inlet end portion of the kiln, means in the material inlet end portion of the rotary kiln proper for accumulating a supply of preheated material prior to passing down through the kiln for sintering, means for feeding a fuel capable of producing a combustible gas upon contacting the hot material directly into the inlet end portion of the rotary kiln proper so as to cause the fuel and accumulated hot material to become intimately mixed so as to produce a combustible gas which is directed to the calcination chamber together with the kiln hot exit gases, means for introducing an oxygen-containing gas to said calcination chamber such that upon passing the combustible gas thereby produced through said calcination chamber, combustion of the oxygen-containing gas results in at least partial substantially isothermal calcination of the material.

16. The plant according to claim 15 wherein said preheating means is a cyclone suspension preheater for preheating the raw material prior to being introduced into the rotary kiln.

17. The plant according to claim 16 wherein said cyclone preheater includes a riser pipe associated with the lowermost cyclone positioned in communicating relation with the inlet end portion of the rotary kiln to comprise said calcination chamber.

18. The plant according to claim 16 further comprising means in the upper end portion of the rotary kiln for forming an accumulation of the at least partially calcined raw material in the kiln inlet portion with means being provided for feeding the fuel for at least partially calcining the raw material into the upper end portion of the kiln.

19. The plant according to claim 18 wherein the means for forming in the kiln inlet portion an accumulation of raw meal comprises a ring-like member projecting inwardly from a lining of the kiln downstream of the location in which the raw meal is introduced into the kiln to restrict the kiln diameter and facilitate said accumulation of raw meal.

20. The plant according to claim 18 wherein said means for forming in the kiln inlet portion an accumulation of material comprises an outward bulge in the kiln wall positioned approximately at the location where the means for feeding fuel opens into the kiln.

21. The plant according to claim 16 wherein said raw material is in the form of cement raw meal and the final heat treated product from said kiln is cement clinker and said plant further comprises:
   a. means for cooling cement clinker after heat treatment in the kiln;
   b. means for feeding at least a portion of the heated cooling air from said cooling means to said calcinator to form at least a portion of the oxygen-containing gas.

22. The plant according to claim 21 wherein said means for feeding the oxygen-containing gas to said calcinator comprises a pipe means connected to an outlet portion of the clinker cooling means.

23. The plant according to claim 17 wherein said raw material is in the form of cement raw meal and the final heat treated product from said kiln is cement clinker and said plant further comprises:
   a. means for cooling cement clinker after heat treatment in the kiln; and
   b. means for feeding at least a portion of the heated cooling air from said cooling means to said calcinator to form at least a portion of the oxygen-containing gas.

24. The plant according to claim 23 wherein said means for feeding the oxygen-containing gas to said calcinator comprises a pipe means connected to an outlet portion of the clinker cooling means.

25. The plant according to claim 22 further comprising means for mixing heated cooling air from said clinker cooler and atmospheric air for feeding the calcinator therewith as at least a portion of said oxygen-containing gas introduced to said calcinator.

26. The plant according to claim 25 further comprising means for directing heated cooling air from said clinker cooler to a mixing station, means for directing atmospheric air to said mixing station and damping means for regulating the mixture of heated cooling air and atmospheric air directed to said calcination chamber.

27. The plant according to claim 15 further comprising:
   a. means for introducing into the lower end of the inclined rotary kiln, secondary combustion air in an amount greater than is required for nourishing with oxygen a flame burning in the kiln carrying out the heat treatment in the kiln; and
   b. means for directing the surplus of oxygen-containing gas passing out of the upper material inlet portion of the kiln as part of the kiln exit gas in a manner to at least partially supply said oxygen-containing gas to said calcination chamber 28. A plant for heat treating substantially uncalcined preheated pulverous raw material in the form of cement raw meal which comprises an inclined rotary kiln for sintering the cement material, the kiln having an upper material inlet end portion and a lower material outlet end portion, a calcination chamber connected in sealed relation to the upper material inlet end portion adapted to receive hot kiln exit gases, a multistage cyclone suspension preheater communicating with said calcination chamber and said kiln, means for directing preheated, at least partially calcined material from the last cyclone stage of said preheater to the upper material inlet end portion of the rotary kiln proper for accumulation therein prior to passing down through the kiln for sintering, cooling means communicating with the outlet end portion of the kiln for cooling cement clinker exiting from the kiln, means for feeding a fuel capable of producing a combustible gas upon contacting hot material directed into the upper material inlet end portion of the rotary kiln proper so as to be tumbled therein to cause the fuel and accumulated hot material to become intimately mixed so as to produce a combustible gas, means for maintaining a draft to cause the combustible gas to pass with the hot kiln exit gases through the upper material inlet end portion of the kiln to the calcination chamber, means for directing a supply of preheated material from the penultimate cyclone stage of the preheater to the calcination chamber in a manner to suspend the material in the calcination chamber in the gases exiting from the kiln, means for directing an oxygen-containing gas from the cooling means to the calcination chamber such that upon passing the combustible gas thereby produced to said calcination chamber, combustion of the oxygen-containing gas results in at least a partial substantially isothermal calcination of the preheated material prior to directing said combined material and gases to the last cyclone stage of said preheating means for separation therein, and means for directing a continuous supply of preheated, at least partially calcined material from the last cyclone stage of said preheating means to said rotary kiln.

* * * * *